United States Patent [19]

Roark

[11] 4,366,946
[45] Jan. 4, 1983

[54] BALL VALVE MECHANISM

[76] Inventor: Earl L. Roark, Houston, Tex.

[21] Appl. No.: 221,276

[22] Filed: Dec. 30, 1980

[51] Int. Cl.³ ............................................ F16K 25/00
[52] U.S. Cl. .................................... 251/159; 251/161; 251/188
[58] Field of Search ................. 251/159, 161, 170, 188

[56] References Cited

U.S. PATENT DOCUMENTS 2,709,455 5/1955 Greenwood ..................... 251/159 X
2,863,629 12/1958 Knox .................................... 251/171
3,653,631 4/1972 Hurst .................................... 251/159

Primary Examiner—Harold W. Weakley
Attorney, Agent, or Firm—Gunn, Lee & Jackson

[57] ABSTRACT

A ball valve mechanism is provided having an internal movable valve seat element that is positioned for linear movement with respect to a valve ball that is positioned for rotation within the valve body. A mechanism for inducing linear movement to the movable seat element is provided which has the capability of retracting the seat member to allow relatively free rotation of the valve ball element or to force the seat member into sealing engagement with the valve ball with force of sufficient magnitude to induce sealing engagement between the valve ball and a pair of opposed seat surfaces within the valve mechanism. The valve body structure is constructed to facilitate actuation of the linearly movable seat member by an actuator ring that is supported by bearings within an annular groove defined by the valve body structure. The actuator ring has mating threaded engagement with seat drive elements positioned internally of the valve mechanism, which threaded engagement translates rotary motion of the actuator ring into linear motion of the seat drive means and seat element.

15 Claims, 3 Drawing Figures

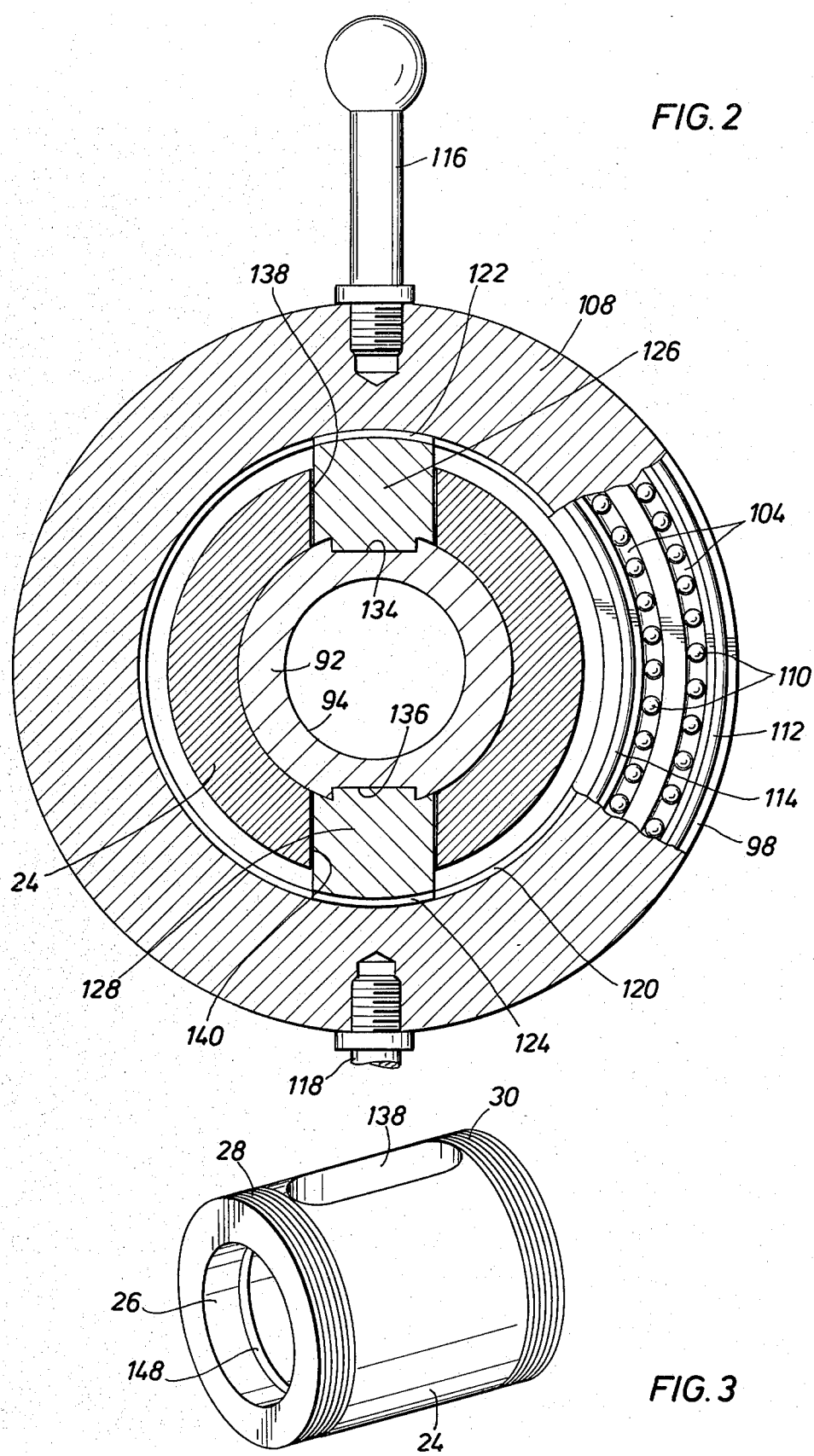

BALL VALVE MECHANISM

FIELD OF THE INVENTION

This invention relates generally to ball valve mechanisms capable of controlling the flow of fluid through product flow systems and more particularly, relates to a ball valve mechanism capable of employing high pressure metal seats and promoting efficient opening and closing movement of an internal rotary ported valve ball without causing deterioration of the valve ball or seat sealing surfaces by scratching, galling or the like.

BACKGROUND OF THE INVENTION

In most cases, ball valves are provided with plastic or elastomer seats that are maintained in positive seating engagement with a metal valve ball at all times. These particular materials are preferred for use as ball valve seats because of the sealing capability provided thereby and because they do not tend to scratch or erode the spherical sealing surface of the ball as the ball is rotated during opening and closing movement. Moreover, plastic and elastomeric seat members have a certain degree of resiliency and may be slightly deformed so as to maintain a certain degree of mechanical pressure between the seats and the sealing surface of the valve ball to enhance the sealing capability thereof.

In many cases, it is desirable to utilize metal seat elements because of the high pressure sealing capability thereof. It is well known, however, that metal seats can cause rapid deterioration of the sealing surface of valve balls if the valve ball element is rotated while the valve is under high pressure. The reaction between metal sealing surfaces of seat assemblies and the spherical sealing surface of a metal valve ball can cause scratching, erosion or galling of either of these metal sealing surfaces. When this occurs, of course, the valve mechanism will be incapable of developing a positive seal and leakage will occur. It is desirable, therefore, to provide metal sealing surfaces within the valve mechanism to enhance high pressure sealing capability and it is also desirable to provide means for ensuring against damage to the sealing surfaces as the valve mechanism is operated under high pressure conditions.

THE PRIOR ART

In the past, a number of valve mechanisms have been developed that provide the user with the capability of opening and closing the valve without encountering excessive resistance to rotation of a valve ball which must be overcome by application of a significant amount of torque. For example, U.S. Pat. No. 3,653,631 of Hurst discloses a ball valve mechanism incorporating a seat assembly that is movable upon externally controlled rotation of a worm gear mechanism which in turn imparts controlling rotation to an internal seat drive arrangement. The downstream seat assembly takes the form of a piston which is actuated either mechanically or hydraulically. In U.S. Pat. No. 3,156,445 of Swain, an internal threaded seat drive mechanism is controlled by means of an external actuator. U.S. Pat. Nos. 3,038,693 of Dumm and 1,738,450 of Ryan et al disclose cam energized systems for accomplishing positioning of seats within a ball valve construction. Other prior art patents of interest are U.S. Pat. Nos. 3,124,333 of Sivyer; 2,788,017 of Scherer; 3,198,763 of Richards; 3,765,645 of Paul; and 3,209,778 of Flohr. Other seat controlling arrangements for ball valves are indicated by U.S. Pat. Nos. 3,472,271 of Allen; 1,941,839 of Johanssen; 217,954 of Perkins; and 712,350 of Williamson.

SUMMARY OF THE INVENTION

It is therefore a primary feature of the present invention to provide a novel ball valve construction wherein a movable internal seat mechanism is employed to facilitate controlling seat pressure between metal sealing surfaces and thus facilitating opening and closing movement of the valve mechanism while, at the same time, promoting efficient sealing at all pressure conditions.

It is an even further feature of this invention to provide a novel ball valve mechanism incorporating an internally movable seat assembly that is controlled externally of the valve and wherein the controlling mechanism therefor provides a wide range of control capability so as to achieve optimum seat pressure control.

It is also an important feature of this invention to provide a novel ball valve mechanism having an internally movable seat assembly and wherein the body structure of the ball valve mechanism incorporates a pair of housing or body sections that cooperate to define a manual actuator groove within which is received a seat actuator that is supported for rotation by a bearing system and is sealed with respect to the body sections.

It is another feature of this invention to provide a ball valve mechanism having a pair of body sections that are internally bridged to define a unitary valve body structure and wherein the body sections cooperate to define an actuator groove within which is received a seat actuator mechanism for allowing external control of internal seat means.

Other and further objects, advantages and features of the present invention will become apparent to one skilled in the art upon consideration of the written specification, the attached claims and the annexed drawings. The form of the invention, which will now be described in detail, illustrates the general principles of the invention, but it is to be understood that this detailed description is not to be taken as limiting the scope of the present invention.

Briefly, the invention concerns a ball valve mechanism incorporating a valve body structure having a pair of valve body sections that are structurally bridged in such manner as to define a unitary valve body structure. The valve body sections define opposed surface portions that cooperate to define an annular groove within which is received an annular seat actuator element with operating handles being connected to the seat actuator element so as to promote manual rotation of the operator element and thus manual external control of internal seat means. The opposed surfaces of the body sections are formed to define bearing receptacles within which are received bearing elements with the bearing elements also being partially received within receptacles defined in the seat actuator element. The seat actuator element is thus rotatably secured in assembly with the body sections by means of the bearing elements. Sealing elements are also provided to establish annular seals radially inwardly and outwardly of the bearing elements, thus establishing a sealed relationship between the seat actuator element and each of the body sections.

The ball valve mechanism is provided with a spherical plug or ball element that is ported in the usual manner and is supported for rotation within one of the housing sections by means of a valve stem and trunnion assembly. A seat element of generally tubular form is positioned within the valve body mechanism and is linearly movable with respect to the valve ball and is formed to define a metal seat surface that is capable of establishing sealing engagement with the spherical sealing surface of the valve ball. The seat element is movable linearly within the valve chamber of the valve mechanism by means of a threaded drive mechanism which is energized by means of rotation of the bearing supported seat actuator element. Upon rotation of the seat actuator element, the rotary motion thereof is translated into linear movement of internal seat drive means which in turn transmits this linear movement to the seat element to retract the seat element out of sealing contact with the spherical sealing surface of the valve ball.

BRIEF DESCRIPTION OF THE DRAWINGS

In order that the manner in which the above-recited advantages and features of the invention are attained and can be understood in detail, more particular description of the invention, briefly summarized above, may be had by reference to the specific embodiment thereof that is illustrated in the appended drawings, which drawings form a part of this specification. It is to be understood, however, that the appended drawings illustrate only a typical embodiment of this invention and therefore are not to be considered limiting of its scope, for the invention may admit to other equally effective embodiments.

IN THE DRAWINGS

Figure 1:
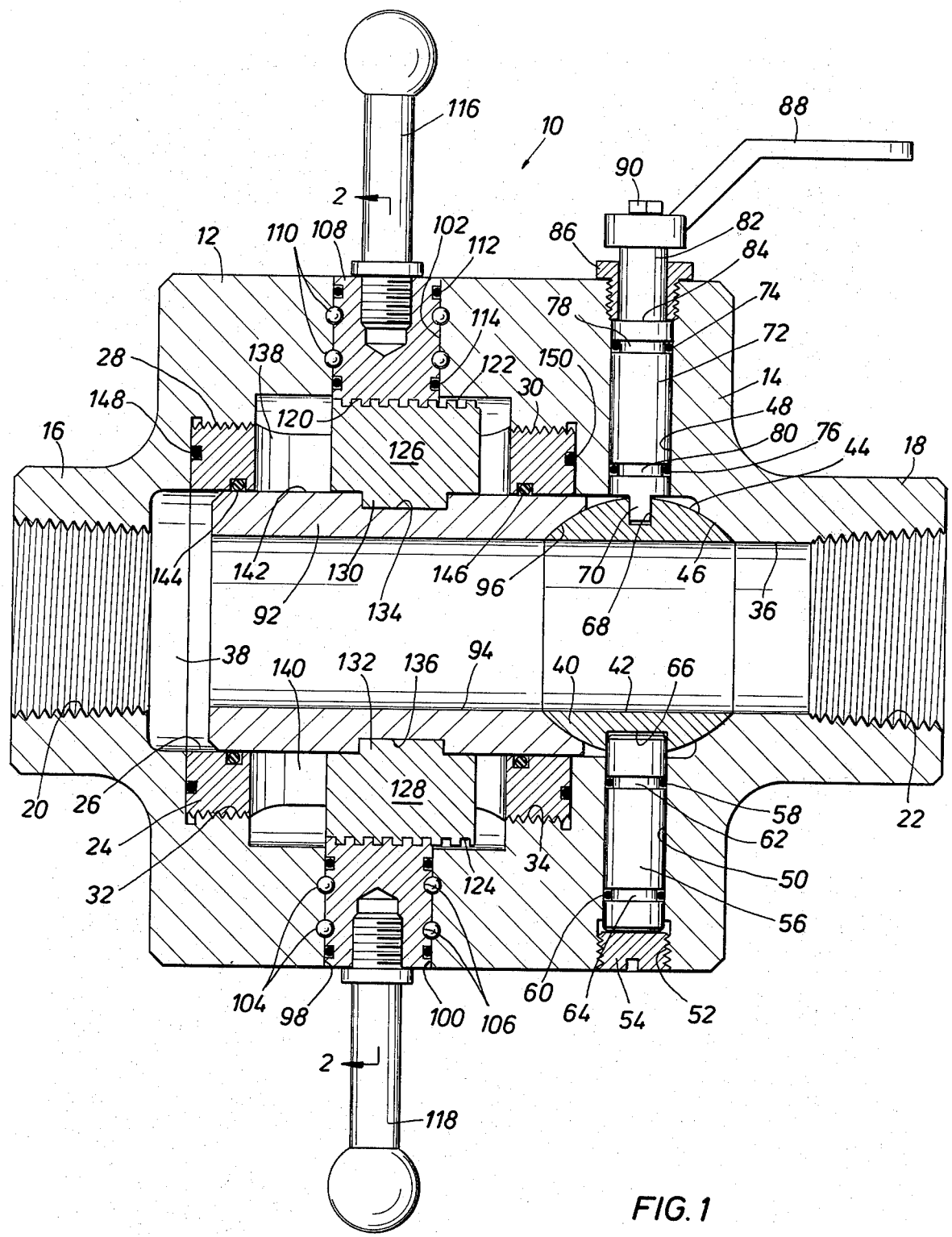

FIG. 1 is a sectional view of a ball valve mechanism constructed in accordance with the present invention and showing the spherical plug or ball element thereof in the open position with the ball valve port in registry with flow passages defined by the valve body and seat structures.

FIG. 2 is a transverse sectional view taken along line 2—2 of FIG. 1 and having portions thereof broken away so as to show the bearing support and seal structures of the actuator element in detail.

FIG. 3 is an isometric view illustrating the internal connector element of the valve body structure and illustrating the configuration of the seat drive groove thereof in detail.

DETAILED DESCRIPTION OF PREFERRED EMBODIMENT

Referring now to the drawings and first to FIG. 1, a ball valve mechanism is illustrated generally at 10 and is shown in the open and operative condition thereof so as to permit the flow of fluid through a flowline controlled by the valve. The valve mechanism 10 incorporates a pair of valve body sections 12 and 14 that are each provided with line connector portions 16 and 18, respectively, for the purpose of interconnecting the valve mechanism with a flowline. As shown in the drawings, the connector portions 16 and 18 are formed to define internal threads 20 and 22 for threaded connection of the valve mechanism to threaded conduits of a flowline. In the alternative, the valve body sections 12 and 14 may be interconnected with a flowline by bolting, welding or by any one of a number of suitable means of connection without departing from the spirit or scope of this invention.

It is desirable that the body sections 12 and 14 be maintained in spaced relation as will be appreciated hereinbelow, but that the body sections be maintained in interconnected substantially rigid condition thereby forming a body unit or housing. For the purpose of establishing a unitary interconnected relationship between the body sections, a body retainer element is provided as shown at 24 and which comprises the isometric view illustrated in FIG. 3. The retainer element 24 is of generally tubular form and defines a generally cylindrical internal passage 26. The opposed extremities of the retainer element 24 are externally threaded as shown at 28 and 30 and these threaded extremities are received, respectively, by internally threaded portions 32 and 34 defined within respective ones of the body sections 12 and 14. With the respective body sections in threaded engagement with the threaded extremities of the retainer element 24, the retainer element functions as a force transmitting internal structural bridge that transmits forces between the body sections as well as retaining the body sections in physical, substantially rigid interconnected relationship.

The connection portions 16 and 18 of the valve body sections define inlet and outlet passages 36 that are oriented in coaxial relationship and are in fluid communication with a valve chamber 38 that is cooperatively defined by the body sections. For the purpose of controlling the flow of fluids through the flow passages 36, a valve ball element 40 is positioned within the valve chamber 38 and is supported for rotatable movement within the valve chamber. The valve ball is formed to define a port 42 that is adapted to be positioned in registry with the inlet and outlet passages 36 in the open position of the valve so as to permit the flow of fluid through the valve mechanism. The spherical plug or valve ball 40 is formed externally thereof to define a generally spherical sealing surface 44 that is adapted for sealing engagement with a mating, partially spherical sealing surface 46 defined within the valve body section 14 about the flow passage 36.

The valve body section 14 is formed to define opposed stem and trunnion bores 48 and 50 that are disposed in axial alignment. The outer portion of trunnion bore 50 is enlarged and internally threaded as shown at 52 so as to receive a closure plug element 54. A trunnion element 56 of elongated, generally cylindrical form is positioned within the bore 50 and is sealed with respect to the cylindrical surface defining the bore by means of sealing elements 58 and 60 that are received within respective circular seal grooves 62 and 64 that are formed in the trunnion element. The valve ball element 40 is formed to define a trunnion receptacle 66 that receives the inner extremity of the trunnion 56 and thus establishes pivotal support for the valve ball within the valve chamber. The opposite side of the valve ball is formed to define a valve stem receptacle 68 that receives a stem drive projection 70 of an elongated valve stem 72 in nonrotatable driving interconnection. The valve stem 72 is sealed with respect to the bore 48 by means of a pair of circular sealing elements 74 and 76 that are received within respective seal grooves 78 and 80 that are formed in the valve stem 72. The outer portion 82 of the valve stem 72 is of reduced diameter and defines a circular shoulder 84 that is engageable with the inner extremity of a stem retainer element 86 which functions to secure the valve stem 72 within bore 48, thus preventing pressure induced ejection of the valve stem from the bore. An actuator handle 88 is secured to the outer portion of the valve stem 72 by means of a bolt 90, thus providing means for manual rotation of the valve stem 72 and the valve ball 40.

A valve seat element 92 is positioned for linear movement within the valve chamber 38 and is formed to define an internal passage 94 that is adapted for registry with the port 42 of the valve ball 40 and with the inlet and outlet flow passages 36. One extremity of the valve seat element 92 is formed to define an annular sealing surface 96 that is positioned for sealing engagement with the spherical sealing surface 44 of the valve ball.

It is desirable to provide a seat actuator mechanism that is capable of being manipulated externally of the valve for achieving linear movement of the valve seat element 92 within the valve chamber, and thus providing for control of the position of the seat with respect to the valve ball and the degree of seat force that is applied against the valve ball. In accordance with the present invention, a valve seat actuator mechanism may conveniently take the form shown in the drawings where opposed bearing support and sealing surfaces 98 and 100 are defined by the respective body sections 12 and 14. The surfaces 98 and 100 are preferably planar and of generally circular form and are maintained in spaced generally parallel relation by the valve body retainer element 24, thus defining an annular actuator groove 102. The respective body sections defining the opposed surfaces 98 and 100 are also formed to define circular bearing grooves 104. A seat actuator element 108 is positioned in close fitting relation between the surfaces 98 and 100 and defines circular, radially spaced bearing grooves 104 on each side thereof that are positioned in registry with the respective bearing grooves of the surfaces 98 and 100. The registering bearing grooves of the body sections and actuator element cooperate to define radially spaced circular bearing channels on races. A plurality of bearing balls 110 are received by the respective grooves 104 and 106 to provide the valve seat actuator element with rotatable bearing support within the annular actuator groove or receptacle 102. Inner and outer annular sealing elements 112 and 114 are retained within seal grooves defined within the valve actuator element and function to establish annular seals with the respective opposed surfaces 98 and 100. The sealing elements 112 and 114 may be formed by O-rings or any other suitable sealing elements and the respective annular seals established thereby are positioned radially inwardly and radially outwardly of the pairs of bearing grooves 104 and 106. Thus, the valve actuator element 108 is provided with rotary bearing support within the actuator groove 102 and the bearing elements are sealed with respect to internal and external contamination by means of the sealing elements 112 and 114. The valve actuator element 108 is provided with externally extending handles such as shown at 116 and 118 which allows operating personnel to achieve manual rotation of the valve actuator element.

The inner periphery of the ring-like valve actuator element 108 is formed to define internal threads 120 that mate with external threads 122 and 124 that define the outer portions of a pair of seat drive elements 126 and 128, respectively. The seat drive elements are formed, respectively, to define inwardly directed projections 130 and 132 that are received within mating receptacles 134 and 136 that are provided in the outer peripheral portion of the seat element 92, thus establish a driving interconnection with the seat element. Upon rotation of the valve actuator element 108, the threaded interconnection defined by threads 120, 122 and 124 causes the stem drive elements 126 and 128 to be moved linearly within the valve chamber 38. The stem drive elements in turn induce linear movement to the seat element 92 driving it toward or away from the sealing surface 44 of the valve ball 40 depending upon the direction of rotation induced to the valve actuator element.

To prevent rotation of the seat drive elements 126 and 128 as the valve element 108 is rotated, the stem drive elements are received, respectively, within elongated slots 138 and 140 that are formed within the retainer element 24. The elongated slots allow linear movement of the seat drive elements 126 and 128 relative to the retainer element and restrict the seat drive elements against rotation. The seat element defines a generally cylindrical outer surface 142 which is received in relatively close fitting relation within the internal passage 26 of the retainer element 24. Annular sealing elements 144 and 146 are received within annular seal grooves 148 defined within the retainer element and function to establish seals between the seat element and retainer element. The seals established by sealing elements 144 and 146 are positioned at each extremity of the elongated slots 138 and 140 and function to retain the pressurized fluid within the innermost portions of the valve chamber. Thus, the outer portion of the valve chamber, which is an annulus surrounding the seat element 92, is separated from the pressurized fluid controlled by the valve by means of the sealing elements 144 and 146. The sealing elements 112 and 114 of the valve actuator element 108 are therefore subjected to fluid pressure only under circumstances when the sealing elements 144 and 146 should become worn to the extent that leakage occurs. If desired to positively seal the outer portion of the valve chamber with respect to the inner portion thereof, sealing elements 148 and 150 will be positioned between the opposed extremities of the retainer element and the valve body structure to establish a positive seal therebetween.

Spacing of the opposed surfaces 98 and 100 of the valve body sections is controlled by the degree to which the threads 32 and 34 are made up with respect to the threads 28 and 30 of the retainer element 24. Therefore, the surfaces 98 and 100 or the body sections may be very accurately positioned with respect to the opposed surface portions of the valve actuator element 108.

OPERATION

In operating the valve mechanism, the elongated seat element 92 may be first retracted from its engagement with the spherical surface of the valve ball by rotating the valve actuator element 108 in the appropriate direction. The threadedd relationship between the valve actuator element and the seat drive elements 126 and 128, causes the seat drive elements and the seat element to be moved linearly within the elongated slots 138 and 40 of the retainer element 24. With the seat element 92 shifted out of contact with the spherical surface 44 of the valve ball, the rotational torque required to rotate the valve ball is materially reduced. Thus, with the seating force relieved, the actuator handle 88 of the valve stem 72 may be rotated appropriately to selectively position the valve ball 40 at its open or closed position. After such movement has occurred, the valve actuator element 108 is again rotated in the direction necessary to drive the seat element 92 back into sealing engagement with the spherical surface 44 of the valve element. Sufficient mechanical force may be induced to the seat element 98 to achieve optimum metal-to-metal sealing contact between sealing surface 44 of the valve ball and seat surfaces 46 and 96.

Upon retraction of the seat element, the valve ball may be rotated without causing scratching or galling of the valve seat surfaces or the sealing surface of the valve ball. Thus, metal material may be efficiently utilized to form the seat surfaces and the valve ball and the valve mechanism is thus developed for high pressure service without any possibility of damage during controlling operation of the ball valve mechanism.

Having thus explained my invention in detail, I claim:

1. A ball valve mechanism comprising:

a pair of body sections each being formed to define flow passage means and defining connection means for interconnection of said valve mechanism within a flow system, said body sections cooperating to define a valve chamber and forming an annular actuator opening disposed about the valve body and extending from the exterior of said body sections to said valve chamber, a first seat surface being provided within one of said body sections;

retainer means interconnecting said body sections in assembled relation;

a ported valve ball element being movably positioned within said valve chamber and being rotatable between open and closed positions with respect to said flow passage means to control the flow of fluid through the flow passages, said valve ball element adapted for sealing enegagement with said first valve seat;

means for inducing selective rotation of said valve ball element to the open and closed positions thereof;

a valve seat element being positioned for linear movement within said valve chamber and defining a second seat surface for sealing engagement with said valve ball element;

seat drive means being interconnected in force transmitting relation with said valve seat element and defining first drive thread means; and an annular actuator element exposed externally of said valve body and being maintained in sealed movable relation within said annular actuator opening of said body sections and defining second drive thread means, said second drive thread means establishing driving relation with said first drive thread means, said second drive thread means establishing driving relation with said first drive thread means, said annular actuator element being manually movable in rotatable manner to induce linear movement to said seat drive means and said valve seat element to establish forcible sealing contact of said valve ball element with said first and second seat surfaces.

2. A ball valve mechanism as recited in claim 1, wherein:

handle means is provided on said actuator element to provide for manual rotation of said actuator means.

3. A ball valve mechanism as recited in claim 1, wherein:

said actuator element is of ring-like configuration and is received within said actuator opening and being rotatable with respect to said body sections, an annular outer portion of said actuator element being exposed at the outer portion, said second drive thread means being formed on the inner periphery of said annular actuator element.

4. A ball valve mechanism as recited in claim 3, wherein:

said body sections are each formed to define annular sealing surface means; and annular seal means establishing said sealed relation between said actuator element and said sealing surface means of said body sections.

5. A ball valve mechanism as recited in claim 3, wherein:

said body sections are formed to define cooperative bearing receptacle means;

said annular actuator element is also formed to define cooperative bearing receptacle means; and bearing means being received within said cooperative bearing receptacle means of said body sections and actuator element.

6. A ball valve mechanism as recited in claim 5, wherein:

said body sections are each formed to define annular sealing surface means; and annular seal means establishes said sealed relation between said actuator element and said sealing surface means of said body sections.

7. A ball valve mechanism as recited in claim 6, wherein:

said annular sealing surface means are generally circular surfaces disposed in substantially parallel relation;

said bearing receptacles are circular grooves; and said annular seal means comprises a pair of generally circular sealing elements, one being positioned radially inwardly of said bearing receptacles and one being positioned radially outwardly of said bearing receptacles.

8. A ball valve mechanism as recited in claim 3, wherein said seat drive means comprises:

opposed seat drive elements being interconnected with said valve seat element, each of said seat drive elements being formed to define thread segments which comprise said first drive thread means, said thread segments being engaged with said second drive thread means, upon selective rotation of said actuator means said seat drive elements and valve seat element are moved linearly within said valve chamber the direction of said linear movement being controlled by the direction of rotation of said actuator element.

9. A ball valve mechanism as recited in claim 1, wherein said retainer means comprises:

a force transmitting retainer element being disposed within said valve chamber; and means connecting said retainer element in substantially immovble relation with each of said body sections and cooperating therewith to establish a substantially rigid valve body structure.

10. A ball valve mechanism as recited in claim 9, wherein:

said retainer means defines an internal passage;

said seat member is received within said internal passage of said retainer means; and retainer seal means establishes a seal between said retainer means and seat member.

11. A ball valve mechanism as recited in claim 9, wherein:

said retainer seal means cooperates with said retainer element and seat element to partition said valve chamber into inner and outer portions and to prevent entry of pressurized fluid into the outer portion of said valve chamber.

12. A ball valve mechanism as recited in claim 1, wherein:

said body sections are formed to define internal body connection threads; and said retainer means is an elongated tubular force transmitting retainer member disposed within said valve chamber and having threads formed at each extremity thereof and being in threaded engagement with said body connection threads of both of said body sections, said body sections and said force transmitting retainer member cooperating to define a substantially rigid valve body structure.

13. A ball valve mechanism as recited in claim 12, wherein:

said retainer member is formed to define guide slot means; and said seat drive means extending through said guide slot means and being capable of linear movement within said guide slot means.

14. A ball valve mechanism as recited in claim 12, wherein:

said valve seat member defines a flow passage for registry with the port of said ported valve ball element and further defines drive receptacle means; and said seat drive means being defined by seat drive element each defining drive projection means, said drive projection means being receivable in interconnected driving relation within said drive receptacle means.

15. A ball valve mechanism as recited in claim 14, wherein:

said valve seat element is of generally tubular form and defines a flow passage for registry with the port of said ported valve ball element, said valve seat element being linearly movable within said valve chamber;

said retainer member is of elongated generally tubular configuration and is formed to define elongated guide slot means oriented in substantially parallel relation with the direction of said linear movement of said valve seat element, said retainer element is further formed to define a pair of spaced annular seal receptacles being positioned beyond the opposed ends of said guide slot means; and annular seal elements being positioned within said annular seal receptacles and establishing spaced seals with said valve seat element, said spaced seal being located beyond each extremity of said elongated guide slot means.

* * * * *